(12) United States Patent
Quang (10) Patent No.: US 9,458,006 B2
(45) Date of Patent: Oct. 4, 2016

(54) NON-PRESSURIZED FLUID LEVEL SHUTOFF FOR FUEL TANK

(71) Applicant: ADEL WIGGINS GROUP, Los Angeles, CA (US)

(72) Inventor: Christopher Quang, Pasadena, CA (US)

(73) Assignee: ADEL WIGGINS GROUP, Los Angeles, CA (US)

( * ) Notice: Subject to any disclaimer, the term of this patent is extended or adjusted under 35 U.S.C. 154(b) by 282 days.

(21) Appl. No.: 14/202,221

(22) Filed: Mar. 10, 2014

(65) Prior Publication Data

US 2014/0261884 A1    Sep. 18, 2014

Related U.S. Application Data

(60) Provisional application No. 61/794,145, filed on Mar. 15, 2013.

(51) Int. Cl.
*B65B 1/30* (2006.01)
*B67D 7/46* (2010.01)
(Continued)

(52) U.S. Cl.
CPC ............... *B67D 7/465* (2013.01); *B60K 15/04* (2013.01); *B65D 88/54* (2013.01); *B65D 90/26* (2013.01); *B67D 7/46* (2013.01); *F15C 1/005* (2013.01); *F15C 1/18* (2013.01); *F16K 1/126* (2013.01); *F16K 21/18* (2013.01); *F16L 37/32* (2013.01); *G01F 23/161* (2013.01); *G01F 23/165* (2013.01); *G05D 9/04* (2013.01); *B60K 15/035* (2013.01); *B60K 2015/048* (2013.01)

(58) Field of Classification Search
CPC ......... B65D 90/26; B67D 7/46; F16K 21/18; B60K 2015/048
USPC .......................................... 141/198, 349, 350
See application file for complete search history.

(56) References Cited

U.S. PATENT DOCUMENTS 3,561,465 A    2/1971   de Graaf
4,211,249 A    7/1980   Richards
(Continued)

FOREIGN PATENT DOCUMENTS

DE        10051492 A1    4/2002
DE    102009061109 B3   12/2012
GB         1051018 A     1/1965

OTHER PUBLICATIONS

International Search Report, Sep. 17, 2014, 6 pages, from PCT/US2014/025056, WO2014/151131A3.

*Primary Examiner* — Jason K Niesz
(74) *Attorney, Agent, or Firm* — Fulwider Patton LLP (57) ABSTRACT

A non-pressurized fluid level shutoff system for a fuel tank includes a fuel receiver having a flow control valve that opens in a direction opposite a direction of fuel flow, and that cannot be manually overridden. A fuel sensor funnels fuel through a fuel jet outlet orifice to form a stream of fuel across a cutout section, and a supplemental peripheral port connected between an outlet orifice mixing chamber and the interior of the tank is oriented perpendicular to the stream of fuel across the cutout section, to interfere with the stream of fuel when the sensor is submerged in fuel in the tank, to further reduce any residual fluid flow signal when the sensor is fully submerged, allowing the flow control valve in the receiver to close completely.

19 Claims, 5 Drawing Sheets

| (51) | Int. Cl. | |
|---|---|---|
| | G01F 23/16 | (2006.01) |
| | B65D 88/54 | (2006.01) |
| | B65D 90/26 | (2006.01) |
| | F15C 1/00 | (2006.01) |
| | F15C 1/18 | (2006.01) |
| | F16K 1/12 | (2006.01) |
| | F16L 37/32 | (2006.01) |
| | F16K 21/18 | (2006.01) |
| | G05D 9/04 | (2006.01) |
| | B60K 15/04 | (2006.01) |
| | B60K 15/035 | (2006.01) |

(56) References Cited

U.S. PATENT DOCUMENTS

| 6,837,262 | B2 | 1/2005 | Cortez et al. |
| 7,258,130 | B2 | 8/2007 | Cortez |
| 7,467,649 | B2 | 12/2008 | Luntz et al. |
| 7,757,709 | B2 | 7/2010 | Cortez |
| 2005/0166966 | A1* | 8/2005 | Cortez ............... B60K 15/035 137/393 |
| 2008/0202600 | A1* | 8/2008 | Peattie ............... B67D 7/46 137/429 |

* cited by examiner

NON-PRESSURIZED FLUID LEVEL SHUTOFF FOR FUEL TANK

CROSS-REFERENCES TO RELATED APPLICATIONS

This application is based upon and claims priority from U.S. Provisional Application No. 61/794,145, filed Mar. 15, 2013, incorporated by reference in its entirety.

BACKGROUND OF THE INVENTION

This invention relates generally to a refueling system and receiver, and more specifically to a dual valve receiver designed to support automatic shutoff fast fill refueling of vehicles without pressurizing the fuel tank.

Large vehicles typically have large fuel tanks ranging up to 1200 gallons and larger, which require fast fill systems to quickly pump a large volume of fuel into these large tanks in order to maintain high work productivity. Refueling receivers commonly work in conjunction with fast fill automatic shutoff nozzles that require tank back pressure build up in order for them to shutoff. In order to use a pressurized refueling system, the fuel tanks have to be structurally designed to withstand internal pressures of up to 10 psi, so that such fuel tanks typically are not appropriate for use in lighter vehicles.

Another current method of refueling involves filling a fuel tank with a release or spill valve which allows excess fuel to spill out of the tank when it is full, indicating to an operator to manually shut off the flow of fuel. However, operators tend to force automatic shutoff nozzles open in order to completely fill pressurized tanks, resulting in frequent fuel spills through an overflow valve or vent. In addition, should a nozzle shut off valve and a tank overflow valve fail at the same time, excessive pressure in the fuel tank can cause the tank to suffer catastrophic failure.

For non-pressurized tank refueling, it has been found that a conventional jet sensor used to sense a fuel level and automatically shut off flow of fuel through a fuel receiver commonly transmits a significant residual hydraulic signal even when the jet sensor is fully submerged in fuel, such as when the fuel tank is completely full, so that it would be desirable to minimize any residual fluid flow signal when the sensor is fully submerged, in order to allow a flow control valve in the fuel receiver to close completely. In addition, non-pressurized refueling systems typically make use of a single signal hose and a hydraulic signal that is controlled by a float valve, so that if the single signal hose is damaged or detached, or if the float valve fails to completely seat, the main fuel flow typically will not shut off and tank overflow can occur. It would therefore be desirable to provide a closed-loop non-pressurized refueling shut off system, so that in the event a signal hose is damaged or detached, the system will fail in a safer condition preventing overfill and over-pressurization of the tank. It would also be desirable to provide a non-pressurized refueling shut off system having a jet sensor with substantially no moving parts, that is less susceptible to wear, and that even if damaged would result in an inability to fill the tank, which is a safer condition than if fuel flow into the tank could not be stopped.

The cost of fuel lost through fuel spills and recent environmental laws make it desirable to avoid fuel spills at refueling stations, so that it would be desirable to provide an automated fuel delivery system for large vehicles which is capable of properly filling fuel tanks and that can avoid the risks of fuel spills and over-pressurization of fuel tanks. The present invention addresses these and other needs.

SUMMARY OF THE INVENTION

Briefly and in general terms, the present invention is directed to a non-pressurized fluid level shutoff system for a fuel tank, including a fuel receiver having a flow control valve that opens in a direction opposite the direction of fuel flow, and that cannot be manually overridden, such as when an operator attempts to manually force a refueling nozzle to be in an on position when it should automatically shut off, so that the fuel receiver will close properly to provide a "positive shutoff" of the fuel receiver, and an improved fuel sensor with an outlet orifice mixing chamber that advantageously includes a supplemental peripheral port connected between the outlet orifice mixing chamber and the fuel tank that dramatically reduces any residual fluid flow signal when the sensor is fully submerged, allowing the flow control valve in the receiver to close completely. The non-pressurized fluid level shutoff system includes a jet sensor having substantially no moving parts, and the non-pressurized fluid level shutoff system is closed-loop, so that in the event signal hose is damaged or detached, the system will fail in a safe condition preventing overfill and over-pressurization of the tank.

The present invention accordingly provides for a non-pressurized fluid level shutoff system for a fuel tank, including a fuel tank, a fuel receiver connected in fluid communication with the fuel tank and configured to be removably connected in fluid communication with a refueling nozzle, and a sensor connected to the fuel receiver and exposed inside the fuel tank, and configured to detect a level of fuel in the fuel tank.

The fuel receiver includes a receiver body having a receiver inlet, a receiver outlet, and an inlet chamber connected in fluid communication between the receiver inlet and the outlet and defining a main fuel path between the receiver inlet and the receiver outlet with a direction of fuel flow within the fuel receiver toward the outlet. The receiver body includes an inlet valve adjacent to the inlet configured to move between a closed position sealing the inlet and an open position allowing fuel to flow into the inlet chamber in the receiver body, and the inlet valve is biased toward the closed position. The receiver body includes a sensor inlet fuel path and a return fuel path, and the return fuel path is connected in fluid communication with a flow control chamber in the fuel receiver including a flow control valve configured to move between an open position and a closed position. The open position of the flow control valve is configured to allow fuel to enter the fuel tank through the main fuel path, and the flow control valve is configured to move to the open position in a direction opposite the direction of fuel flow within the fuel receiver. The sensor is connected in fluid communication with the sensor inlet fuel path to provide a flow of fuel from the fuel receiver to the sensor.

In a presently preferred aspect, the fuel receiver includes an exterior nipple interface at the inlet configured to connect to a refueling nozzle. In another presently preferred aspect, the inlet valve includes a nipple poppet that seals the inlet. In another presently preferred aspect, the inlet valve includes a tubular shaft connected to the nipple poppet. In another presently preferred aspect, the tubular shaft of the inlet valve is slidingly mated for movement in an inlet valve recess in the inlet chamber between the closed and open positions of the inlet valve.

In another presently preferred aspect, the inlet valve is biased toward the closed position by a first spring retained within an inner chamber of the tubular shaft, and the first spring is fitted against the nipple poppet at one end of the first spring and a wall of the recess at an opposing end of the first spring. In another presently preferred aspect, the sensor inlet fuel path is connected in fluid communication with a sensor pick-up fitting connected to the receiver body. In another presently preferred aspect, the sensor pick-up fitting is connected to a sensor pick-up hose connected in fluid communication with the sensor.

In another presently preferred aspect, the return fuel path is connected in fluid communication with a return hose connected to the receiver body with a jet return fitting.

In another presently preferred aspect, the flow control valve includes a generally tubular, cup-shaped valve shaft having an inlet end disposed inside the flow control chamber, and an outlet end. In another presently preferred aspect, the inlet end of the generally tubular, cup-shaped valve shaft is disposed within an inlet portion of the flow control chamber and is fitted over and slidably movable along a central guide in the flow control chamber to guide movement of the generally tubular, cup-shaped valve shaft of the flow control valve between the open and closed positions of the flow control valve.

In another presently preferred aspect, the flow control valve is biased in the closed position in which the outlet end of the valve shaft seals the outlet of the receiver body. In another presently preferred aspect, the flow control valve is biased in the closed position by a second spring disposed within and extending in a spring chamber in the inlet end of the flow control valve to the inlet end of the flow control chamber.

In another presently preferred aspect, a seal is provided around the inlet end of the flow control valve configured to prevent fuel from escaping from the inside the flow control chamber. In another presently preferred aspect, the seal around the inlet end of the flow control valve comprises a spring energized seal.

When the flow control chamber is pressurized, the pressurized fuel displaces the flow control valve from the closed position to the open position, allowing fuel to fill the tank. As the fuel within the fuel tank begins to rise, the fuel reaches a level where the fuel flow through the sensor is interrupted. Once the interruption occurs, the pressure build up within the return fuel path and flow control chamber decreases, and the flow control valve begins to close once the second spring overcomes the pressure in the flow control chamber.

In another presently preferred aspect, the sensor comprises a jet sensor including a sensor body having a base section including a sensor inlet and a sensor outlet, and a stem section including a fuel channel connected in fluid communication between the sensor inlet and the sensor outlet. The fuel channel preferably includes a sensor fuel receiving section configured to receive fuel from the sensor inlet and to direct fuel received in the sensor fuel receiving section to a fuel jet outlet orifice, an outlet orifice mixing chamber connected in fluid communication with the fuel jet outlet orifice, a fuel jet inlet orifice connected in fluid communication with the sensor outlet, and a cutout section connected between the outlet orifice mixing chamber and the fuel jet inlet orifice. The fuel jet inlet orifice preferably is configured to conduct fuel received across the cutout section through the sensor outlet to the fuel receiver, and the outlet orifice mixing chamber advantageously includes a supplemental peripheral port connected between the outlet orifice mixing chamber and the fuel tank.

In another presently preferred aspect, the sensor fuel receiving section includes a first tapered section that funnels fuel from the sensor fuel receiving section out through the fuel jet outlet orifice to form a stream of fuel across the cutout section to the fuel jet inlet orifice. In another presently preferred aspect, the supplemental peripheral port is oriented perpendicular to the stream of fuel across the cutout section. In another presently preferred aspect, a diameter of the sensor inlet optionally may be larger than a diameter of the sensor outlet.

In another presently preferred aspect, a relief valve vent is provided in fluid communication with the fuel tank, the relief valve vent being configured to vent the fuel tank. In another presently preferred aspect, a refueling nozzle is provided that is configured to be removably connected with the fuel receiver. In another presently preferred aspect, the refueling nozzle comprises an automatic shutoff nozzle that automatically shuts off when pressure inside the fuel receiver and nozzle reaches a threshold level.

These and other features and advantages of the present invention will become apparent from the following detailed description taken in conjunction with the accompanying drawings which illustrate, by way of example, the principles of the invention.

DETAILED DESCRIPTION OF THE PREFERRED EMBODIMENTS

Non-pressurized refueling shutoff systems typically are not closed-loop systems, and utilize a single signal hose that can become damaged or detached and a hydraulic signal that is controlled by a float valve that can fail to completely seat, either of which can result in the main fuel flow failing to shut off, leading to tank overflow. The non-pressurized fluid level shutoff system of the present invention is a closed-loop system, so that in the event a signal hose is damaged or detached or a float valve fails, the system will still prevent overfill and over-pressurization of the tank, because there will be no return signal to open the main fuel flow check valve. In addition, since a jet sensor utilized in the non-pressurized fluid level shutoff system of the present invention has substantially no moving parts, it is far less susceptible to wear, and even if it were damaged, the result would be to prevent a flow of fuel into the tank that cannot be stopped.

Figure 1:
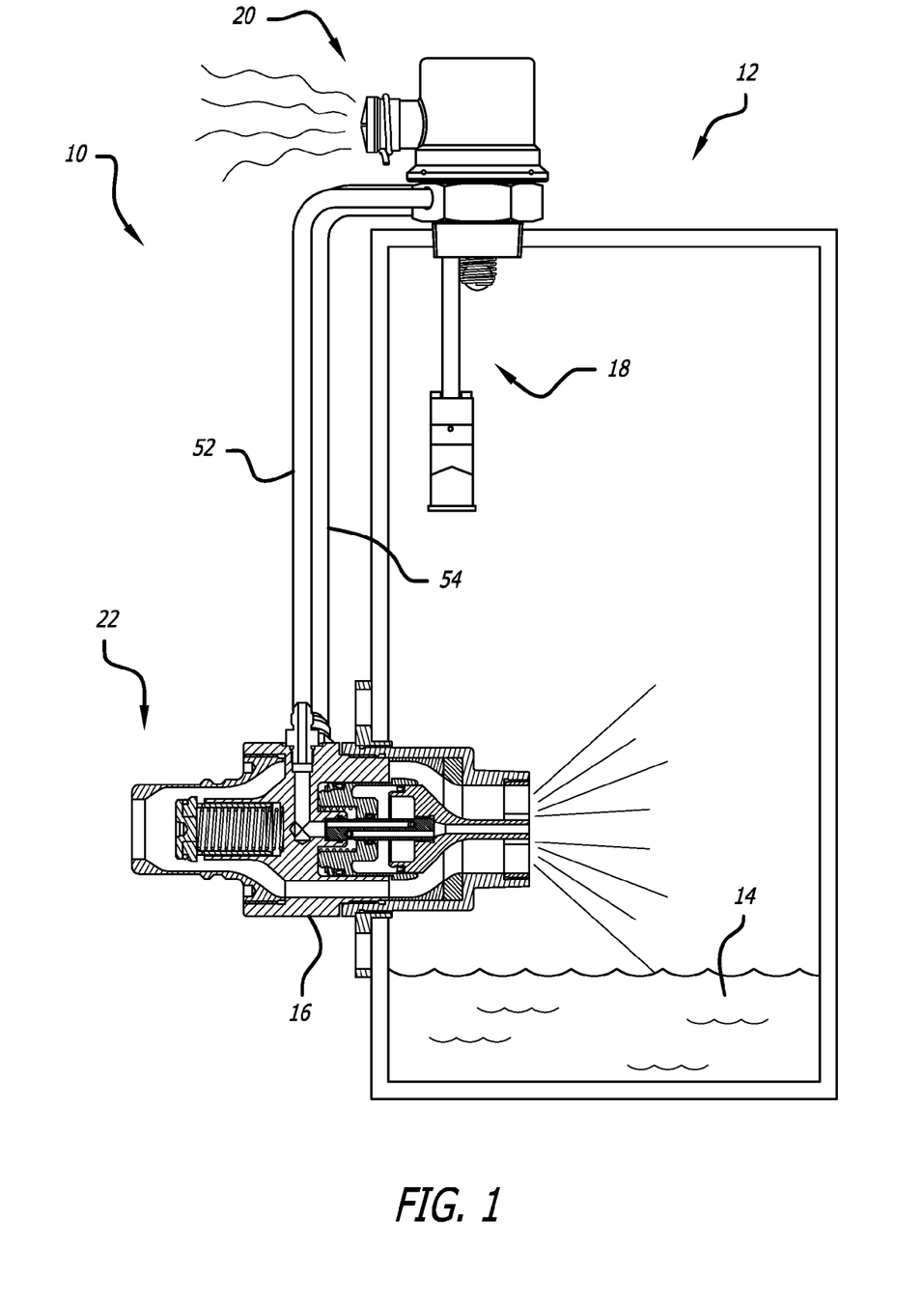
FIG. 1 is a partial cross-sectional elevational view of the non-pressurized fluid level shutoff system for a fuel tank according to the invention.

Referring to the drawings, which are provided by way of example, and not by way of limitation, the present invention provides for a non-pressurized fluid level shutoff system 10 for a fuel tank, including a fuel tank 12, and fuel 14 inside the tank, as is shown in FIG. 1. A fuel receiver 16 is connected in fluid communication with the fuel tank, and a sensor 18, such as a jet sensor, for example, is connected in fluid communication to the fuel receiver and exposed inside the fuel tank to detect the level of the fuel in the tank. A relief valve vent 20 preferably is also provided in fluid communication with the fuel tank to vent the fuel tank, and to relieve any extra air pressure that may build up inside the tank.

A refueling nozzle 22 in fluid communication with a fuel source (not shown) typically is also provided to form a removable connection in fluid communication with the fuel receiver. The refueling nozzle preferably is an automatic shutoff nozzle that automatically shuts off when pressure inside the fuel receiver and nozzle reaches a threshold level.

Figure 2:
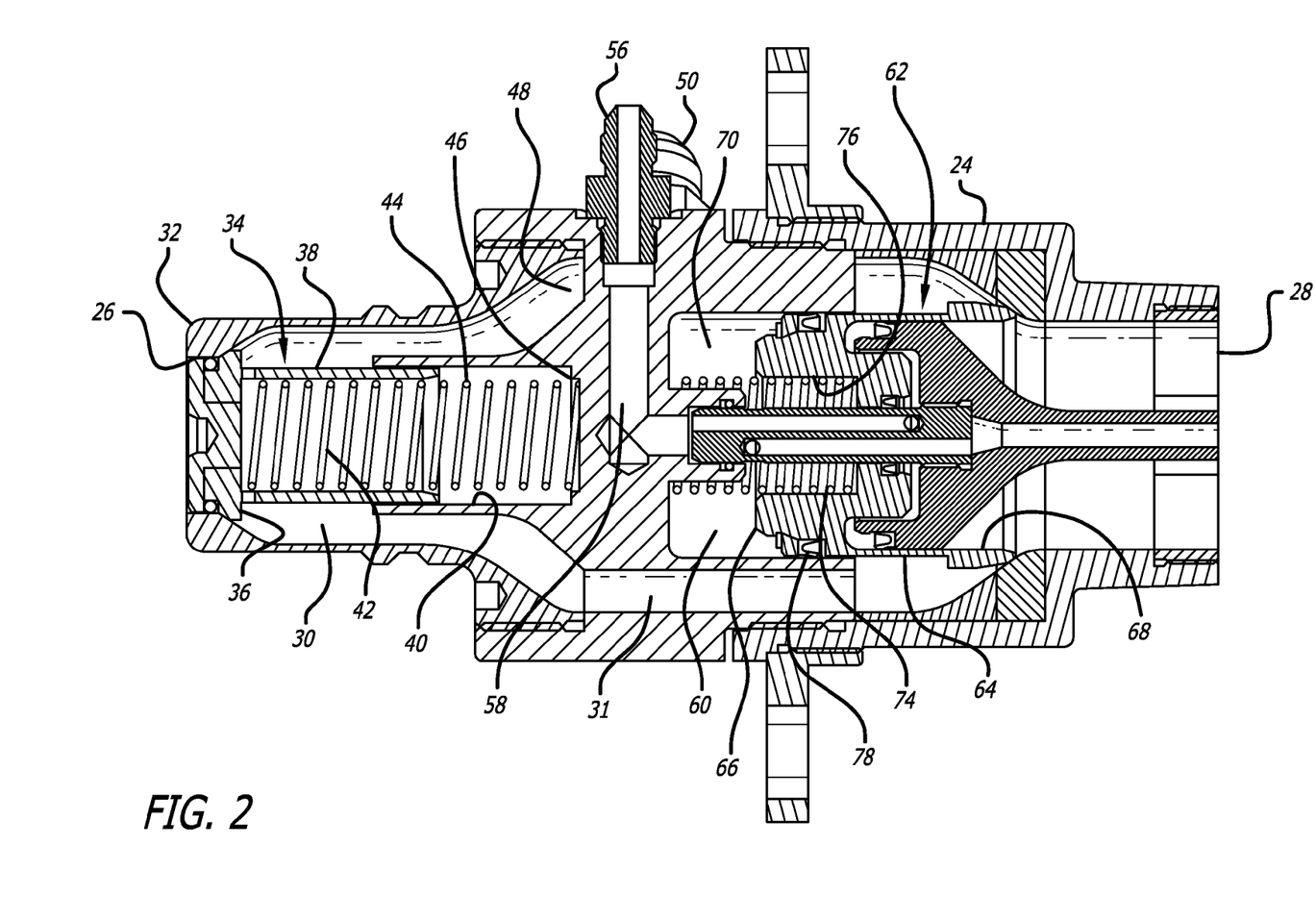
FIG. 2 is cross-sectional elevational view of the fuel receiver of the non-pressurized fluid level shutoff system of FIG. 1, shown in a closed position.
Figure 3:
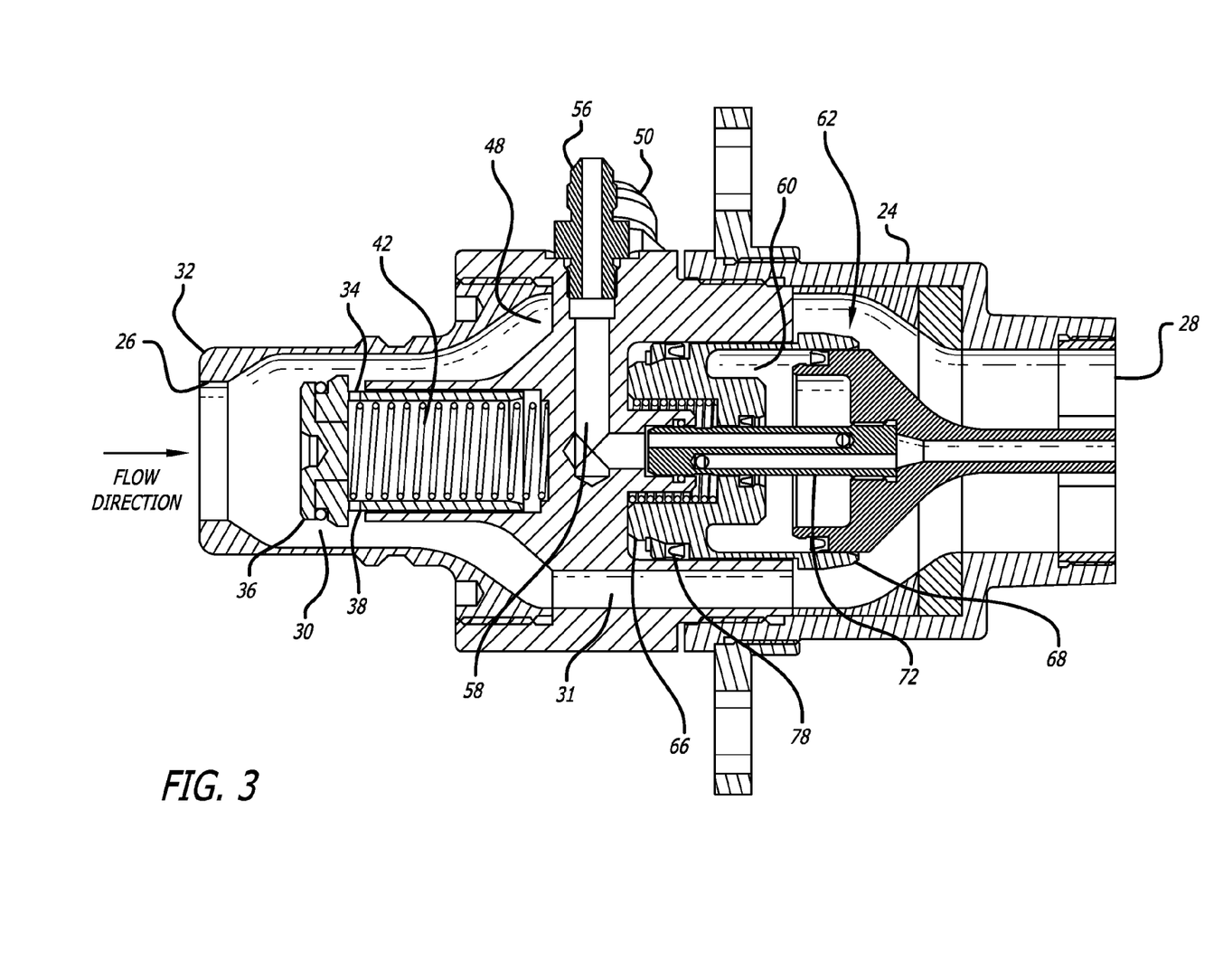
FIG. 3 is a cross-sectional elevational view similar to FIG. 2, showing the fuel receiver in an open position.

Referring to FIGS. 2 and 3, the fuel receiver preferably is a dual valve fuel receiver, having a receiver body 24 with an inlet 26 an outlet 28, and an inlet chamber 30 connected in fluid communication between the receiver inlet and the outlet, and defining a main fuel path 31 between the receiver inlet and the receiver outlet, with a direction of fuel flow within the main fuel path of the fuel receiver toward the receiver outlet. An exterior nipple interface 32 at the receiver inlet connects to the refueling nozzle. An inlet valve 34 disposed inside the receiver body adjacent to the receiver inlet is movable between a closed position sealing the receiver inlet and an open position allowing fuel to flow into the receiver body. The inlet valve also preferably includes a nipple poppet 36 that seals the inlet, and a tubular shaft 38 connected to the nipple poppet. The inlet valve is slidingly mated in a recess 40, and is biased toward the closed position by a first spring 42 retained within an inner chamber 44 of the tubular shaft, and is fitted against the nipple poppet at one end of the spring and a wall 46 of the recess at the other end.

The receiver body also includes a sensor inlet fuel path 48 connected in fluid communication with the sensor to provide a flow of fuel from the fuel receiver to allow the sensor to measure fuel pressure within the fuel receiver. The sensor inlet fuel path typically includes an integrated open ended right angle tube, or Pitot tube (not shown), that leads to a sensor pick-up fitting 50 connected to the body of the fuel receiver. Referring to FIG. 1, the sensor pick-up fitting is connected to a sensor pick-up hose 54 that leads fuel to the sensor, and a return hose 52 is connected to the receiver body with a jet return fitting 56 that is connected through a return fuel path 58 in fluid communication with a flow control chamber 60 in the fuel receiver.

A diameter of the jet pick-up fitting and the sensor pick-up hose optionally may be manufactured to be larger than a diameter of the jet return fitting and return hose, in order to facilitate and sustain pressure in the flow control chamber when fuel flows through the sensor fuel path and the return fuel path. The integrated open ended right angle tube helps direct the incoming flow through the jet pick-up fitting to initiate pressurization of the flow control chamber, and captures a dynamic pressure from the incoming fuel to open the flow control valve of the fuel receiver.

The fuel receiver also includes a flow control valve or check valve 62 including a generally tubular, cup-shaped valve shaft 64 having an inlet end 66 disposed inside the flow control chamber, and an outlet end 68. The inlet end of the generally tubular, cup-shaped valve shaft is disposed within an inlet portion 70 of the flow control chamber and is fitted over and slidably movable along a central guide 72 in the flow control chamber to guide movement of the generally tubular, cup-shaped valve shaft of the flow control valve between open and closed positions of the flow control valve. The flow control valve is biased in the closed position, in which the outlet end of the valve shaft seals the outlet of the receiver body, by a second spring 74 disposed within and extending in a spring chamber 76 in the inlet end of the flow control valve to the inlet end of the flow control chamber. The open position of the flow control valve allows fuel to enter the fuel tank through the main fuel path, which is in fluid communication with the inlet and outlet of the fuel receiver. A seal 78 around the inlet end of the flow control valve, such as a spring energized seal, for example, prevents fuel from escaping from the inside the flow control chamber, in order to maintain the fuel pressure transmitted from the sensor to the flow control chamber, although other types of seals known in the art, including o-rings or the like may also be suitable.

The flow control valve advantageously opens in a direction opposite the direction of fuel flow, and cannot be manually overridden, such as if an operator forces the refueling nozzle on, so that the flow control valve will remain closed to provide a "positive shutoff" of the fuel receiver. The operation of the flow control valve to open in a direction opposite the direction of flow of fluid within the fuel receiver helps to achieve this positive shutoff of the fuel receiver. In addition to the fact that the flow control valve or check valve opens in a direction opposite to the direction of flow, the flow control valve or check valve also preferably is designed such that the pressure that builds up in the receiver during shutoff is slightly biased in favor of shutoff. The diameter of the check valve at the point of contact with the valve seat is preferably slightly larger than the diameter of the sliding, tubular part of the flow control valve or check valve, which results in a net pressure acting in the direction of closing. In short, there is a closing force generated by the pressure acting against the flow control valve or check valve that aids in preventing override of the shutoff.

When the flow control chamber is pressurized, the pressurized fuel displaces the flow control valve from the closed position to the open position, allowing fuel to fill the tank. As the fuel within the fuel tank begins to rise, the fuel reaches a level where the fuel flow through the sensor is interrupted. Once the interruption occurs, the pressure build up within the return fuel path and flow control chamber decreases, and the flow control valve begins to close once the second spring overcomes the pressure in the flow control chamber.

Figure 4:
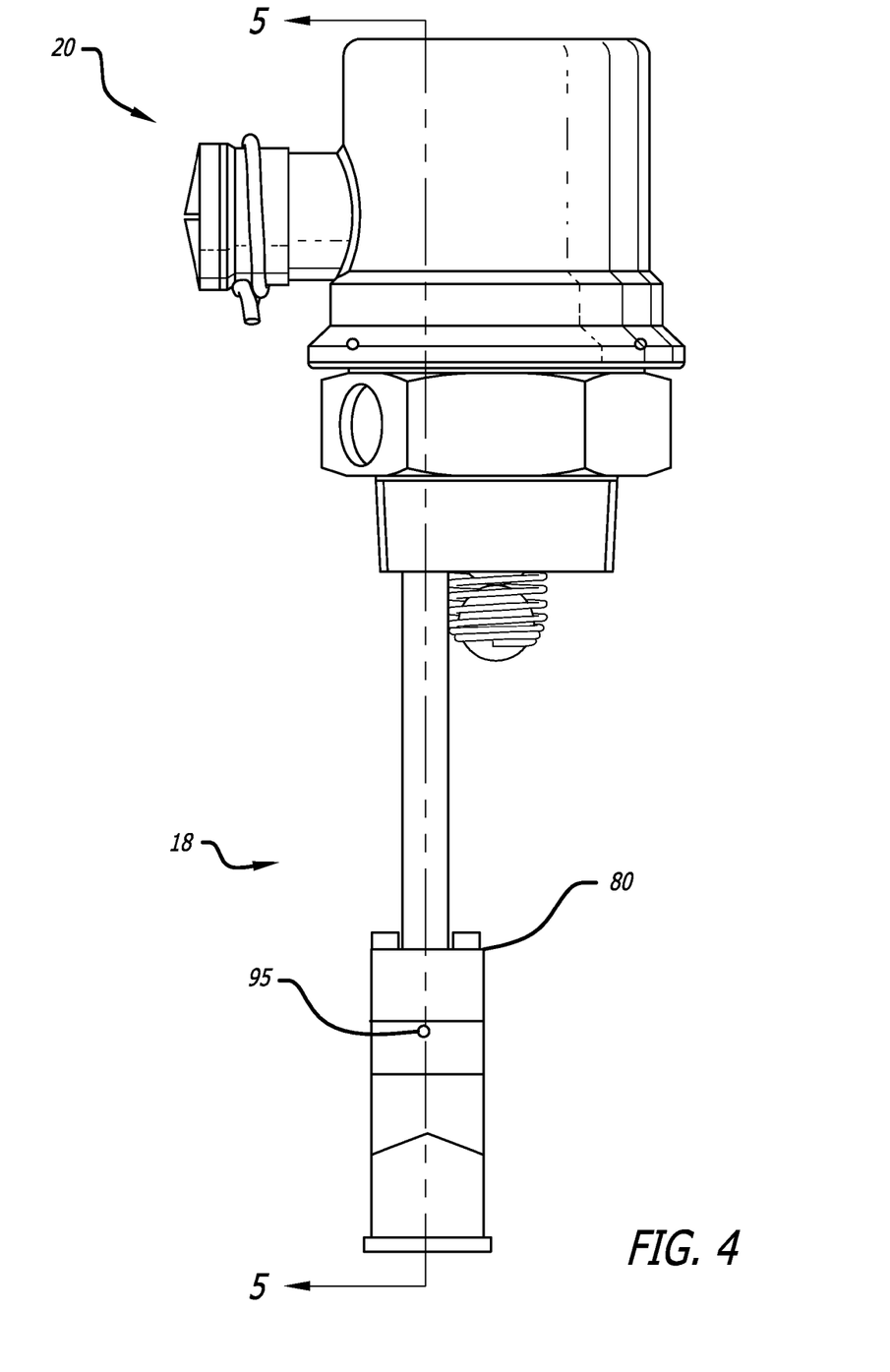
FIG. 4 is an elevational view of the sensor of the non-pressurized fluid level shutoff system of FIG. 1.
Figure 5:
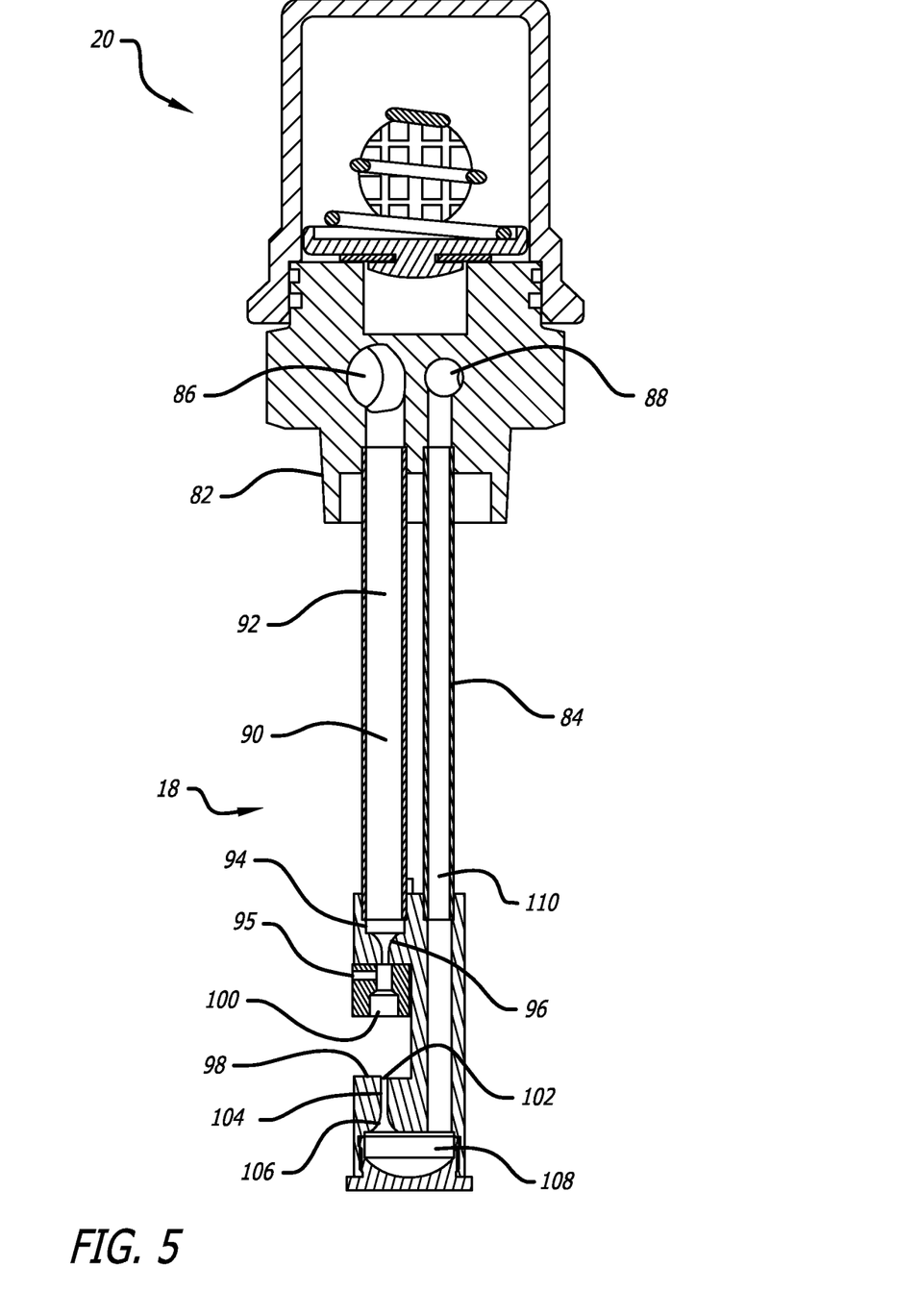
FIG. 5 is a cross-sectional elevational view of the sensor of FIG. 4.

The sensor is preferably a jet sensor, having a sensor body 80, a base section 82, and a stem section 84. The base section includes a sensor inlet 86 and a sensor outlet 88. To facilitate an increased pressure flow of fuel, the diameter of the sensor inlet typically is larger than the diameter of the sensor outlet. A fuel channel 90 formed in the stem section of the jet sensor has a sensor fuel receiving section 92 which receives fuel via the sensor inlet, and directs the fuel to a fuel jet outlet orifice 94. A first tapered section 96 of the sensor fuel receiving section funnels fuel from the sensor fuel receiving section out through the fuel jet outlet orifice, so that fuel from the tapered section then forms a stream of fuel that shoots across a cutout section 98, through an outlet orifice mixing chamber 100 into a fuel jet inlet orifice 102.

The cutout section on the stem section exposes the stream of fuel between the fuel jet outlet orifice and the fuel jet inlet orifice to fuel in the fuel tank when the level of fuel in the tank rises to the level of the cutout section. However, since a significant residual hydraulic signal can be transmitted across a cutout section in a jet sensor even when the jet sensor was fully submerged in fuel, the outlet orifice mixing chamber advantageously includes a supplemental peripheral port 95 connected between the outlet orifice mixing chamber and the fuel tank and oriented perpendicular to the stream of fuel that shoots across the cutout section, so that when the sensor is submerged, fuel having risen to the level of the sensor and the outlet orifice mixing chamber is drawn into the supplemental peripheral port by the Venturi effect, and creates a secondary stream that intersects the stream of fuel that shoots across the cutout section, to dramatically reduce any residual fluid flow signal when the sensor is fully submerged, allowing the flow control valve in the fuel receiver to close completely.

When the sensor is not submerged in fuel, the inlet orifice leads the fuel received across the cutout section first into a narrow path 104 that widens at a second tapered section 106, and then the fuel enters a transition section 108, where the fuel completes a U-turn and enters an elongated second sensor section 110 and flows out through the sensor outlet. The sensor thus operates to pressurize the flow control chamber when fuel is below the predetermined level of fuel within the fuel tank, and to not pressurize the flow control chamber when fuel is at or above the predetermined level of fuel within the fuel tank. Once the fuel level in the fuel tank reaches the cutout section, the stream of fuel from the outlet orifice to the inlet orifice will be interrupted and submerged by the fuel in the tank, thereby stopping the transmission of velocity head or pressure to the narrow path and transition section. There will then be a pressure decrease in the elongated second sensor section, return hose, and flow control chamber, causing the flow control valve to close off the fuel flow into the tank. The interruption of the fuel stream followed by the decrease of pressure in the flow control chamber results in accurate refueling of the tank without under- or over-filling. The cutout section is the detection means in this embodiment, however, other means to interrupt the fuel flow in the fuel channel have been contemplated, and include, but are not limited to, the use of a flotation device to interrupt the flow through the fuel channel and the use of electrical means to disrupt the fuel flow.

During vehicle refueling, the automatic refueling nozzle is connected to the nipple interface of the fuel receiver. The nozzle is then cocked open, to open the nipple poppet inside the fuel receiver by overcoming the biasing force of the first spring. With the inlet open, fuel enters the fuel receiver, and a portion of the fuel is directed up through the sensor fuel path, where the fuel flows through the sensor hose leading to the sensor. The fuel is then channeled through the sensor as described above, and returned through the return hose and jet return fitting into the flow control chamber. As fuel flows into the flow control chamber, the flow control chamber becomes pressurized, causing the flow control valve to open by overcoming the biasing force of the second spring. When the flow control chamber is completely pressurized, the flow control valve opens completely, allowing fuel to enter the fuel tank via the main fuel path. At this point, any further flow through the return hose and jet return fitting is ceased, and flow across the cutout section from the outlet orifice to the inlet orifice helps maintain the pressure. Fuel enters the fuel tank as long as the flow control valve remains open. Once the fuel level reaches the sensor, the rising fuel submerges and interrupts the fuel flow across the cutout section of the sensor, and then the built up hydraulic head on the return fuel path decreases. The flow control valve begins to close once the second spring overcomes the pressure in the flow control chamber. As the flow control valve closes, back pressure builds up within the receiver body and nozzle interface, and fuel flow stops when the shutoff pressure is reached on the automatic shutoff-refueling nozzle. Any undesired pressure in the fuel tank is relieved by the vent. Significantly, the receiver is also able to shut off independently of an automatic shutoff nozzle, in that the receiver does not rely on a pressure-sensitive nozzle to aid shutoff, so that the receiver flow control valve or check valve will not open even if the automatic shutoff mechanism of the nozzle is manually overridden.

It will be apparent from the foregoing that while particular forms of the invention have been illustrated and described, various modifications can be made without departing from the spirit and scope of the invention. Accordingly, it is not intended that the invention be limited, except as by the appended claims.

I claim:

1. A non-pressurized fluid level shutoff system for a fuel tank, comprising:
   a fuel tank;
   a fuel receiver connected in fluid communication with said fuel tank and configured to be removably connected in fluid communication with a refueling nozzle, said fuel receiver including a receiver body having a receiver inlet, a receiver outlet, and an inlet chamber connected in fluid communication between the receiver inlet and the outlet and defining a main fuel path between said receiver inlet and said receiver outlet with a direction of fuel flow within the fuel receiver toward said receiver outlet, said receiver body including an inlet valve adjacent to the inlet configured to move between a closed position sealing the inlet and an open position allowing fuel to flow into the inlet chamber in the receiver body, said inlet valve being biased toward the closed position, said receiver body including a sensor inlet fuel path and a return fuel path, said return fuel path being connected in fluid communication with a flow control chamber in the fuel receiver including a flow control valve configured to move between an open position and a closed position, said open position of said flow control valve being configured to allow fuel to enter said fuel tank through said main fuel path, and said flow control valve being configured to move to said open position in a direction opposite the direction of fuel flow within the fuel receiver; and
   a sensor connected to the fuel receiver and exposed inside the fuel tank, said sensor being configured to detect a level of fuel in the fuel tank, said sensor being connected in fluid communication with said sensor inlet fuel path to provide a flow of fuel from the fuel receiver to the sensor.

2. The non-pressurized fluid level shutoff system of claim 1, wherein said inlet valve includes a nipple poppet that seals the inlet, and said inlet valve includes a tubular shaft connected to said nipple poppet.

3. The non-pressurized fluid level shutoff system of claim 2, wherein said tubular shaft of the inlet valve is slidingly mated for movement in an inlet valve recess in the inlet chamber between the closed and open positions of the inlet valve.

4. The non-pressurized fluid level shutoff system of claim 3, wherein said inlet valve is biased toward the closed position by a first spring retained within an inner chamber of the tubular shaft of the inlet valve, and said first spring is fitted against the nipple poppet at one end of the first spring and a wall of the inlet valve recess at an opposing end of the first spring.

5. The non-pressurized fluid level shutoff system of claim 4, wherein said flow control valve includes a generally tubular, cup-shaped valve shaft having an inlet end disposed inside the flow control chamber, and an outlet end.

6. The non-pressurized fluid level shutoff system of claim 5, wherein said inlet end of the generally tubular, cup-shaped valve shaft is disposed within an inlet portion of the flow control chamber and is fitted over and slidably movable along a central guide in the flow control chamber to guide movement of the generally tubular, cup-shaped valve shaft of the flow control valve between the open and closed positions of the flow control valve.

7. The non-pressurized fluid level shutoff system of claim 5, wherein said flow control valve is biased in the closed position in which the outlet end of the generally tubular, cup-shaped valve shaft seals the outlet of the receiver body.

8. The non-pressurized fluid level shutoff system of claim 7, wherein said flow control valve is biased in the closed position by a second spring disposed within and extending in a spring chamber in the inlet end of the flow control valve to the inlet end of the flow control chamber.

9. The non-pressurized fluid level shutoff system of claim 1, further comprising a relief valve vent in fluid communication with the fuel tank, said relief valve vent being configured to vent the fuel tank.

10. The non-pressurized fluid level shutoff system of claim 1, further comprising a refueling nozzle configured to be removably connected with the fuel receiver.

11. A non-pressurized fluid level shutoff system for a fuel tank, comprising:
a fuel tank;
a fuel receiver connected in fluid communication with said fuel tank and configured to be removably connected in fluid communication with a refueling nozzle, said fuel receiver including a receiver body having a receiver inlet, a receiver outlet, and an inlet chamber connected in fluid communication between the receiver inlet and the outlet and defining a main fuel path between said receiver inlet and said receiver outlet, said receiver body including an inlet valve adjacent to the inlet configured to move between a closed position sealing the inlet and an open position allowing fuel to flow into the inlet chamber in the receiver body, said inlet valve being biased toward the closed position, said receiver body including a sensor inlet fuel path and a return fuel path, said return fuel path being connected in fluid communication with a flow control chamber in the fuel receiver including a flow control valve configured to move between an open position and a closed position, and said open position of said flow control valve being configured to allow fuel to enter said fuel tank through said main fuel path; and
a jet sensor connected to the fuel receiver and exposed inside the fuel tank, said jet sensor being configured to detect a level of fuel in the fuel tank, said jet sensor being connected in fluid communication with said sensor inlet fuel path to provide a flow of fuel from the fuel receiver to the sensor, said jet sensor including a sensor body having a base section and a stem section, said base section including a sensor inlet and a sensor outlet, said stem section including a fuel channel connected in fluid communication between said sensor inlet and said sensor outlet, said fuel channel including a sensor fuel receiving section configured to receive fuel from the sensor inlet and to direct fuel received in the sensor fuel receiving section to a fuel jet outlet orifice, an outlet orifice mixing chamber connected in fluid communication with said fuel jet outlet orifice, a fuel jet inlet orifice connected in fluid communication with said sensor outlet, and a cutout section connected between said outlet orifice mixing chamber and said fuel jet inlet orifice, said fuel jet inlet orifice being configured to conduct fuel received across the cutout section through said sensor outlet to said fuel receiver, and said outlet orifice mixing chamber including a supplemental peripheral port connected between said outlet orifice mixing chamber and said fuel tank.

12. The non-pressurized fluid level shutoff system of claim 11, wherein said supplemental peripheral port is oriented perpendicular to said stream of fuel across the cutout section.

13. The non-pressurized fluid level shutoff system of claim 11, wherein said sensor fuel receiving section includes a first tapered section that funnels fuel from the sensor fuel receiving section out through the fuel jet outlet orifice to form a stream of fuel across the cutout section to said fuel jet inlet orifice.

14. The non-pressurized fluid level shutoff system of claim 11, wherein said main fuel path between said receiver inlet and said receiver outlet includes a direction of fuel flow within the fuel receiver toward said receiver outlet, and said flow control valve is configured to move to said open position in a direction opposite the direction of fuel flow within the fuel receiver.

15. The non-pressurized fluid level shutoff system of claim 11, wherein said sensor inlet fuel path is connected in fluid communication with a sensor pick-up fitting connected to the receiver body.

16. The non-pressurized fluid level shutoff system of claim 15, wherein said sensor pick-up fitting is connected to a sensor pick-up hose connected in fluid communication with the sensor.

17. The non-pressurized fluid level shutoff system of claim 11, wherein said return fuel path is connected in fluid communication with a return hose connected to the receiver body with a jet return fitting.

18. The non-pressurized fluid level shutoff system of claim 11, further comprising a relief valve vent in fluid communication with the fuel tank, said relief valve vent being configured to vent the fuel tank.

19. The non-pressurized fluid level shutoff system of claim 11, further comprising an automatic shutoff refueling nozzle configured to be removably connected with the fuel receiver, said automatic shutoff refueling nozzle being configured to automatically shut off when pressure inside the fuel receiver and nozzle reaches a threshold level.

* * * * *